(12) United States Patent
Aburame et al.

(10) Patent No.: US 12,122,185 B2
(45) Date of Patent: Oct. 22, 2024

(54) VEHICLE WHEEL

(71) Applicant: Mazda Motor Corporation, Hiroshima (JP)

(72) Inventors: Masafumi Aburame, Hiroshima (JP);
Satoshi Okamoto, Hiroshima (JP);
Akihiro Nakata, Hiroshima (JP);
Haruka Taniguchi, Hiroshima (JP);
Shinji Matsuo, Hiroshima (JP);
Hiroshi Kuninari, Hiroshima (JP);
Takuya Matsuda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 401 days.

(21) Appl. No.: 17/591,608

(22) Filed: Feb. 3, 2022

(65) Prior Publication Data
US 2022/0288970 A1    Sep. 15, 2022

(30) Foreign Application Priority Data

Mar. 10, 2021  (JP) .................................. 2021-038226

(51) Int. Cl.
*B60B 21/10* (2006.01)
*B60B 3/02* (2006.01)
(Continued)

(52) U.S. Cl.
CPC .............. *B60B 21/102* (2013.01); *B60B 3/02* (2013.01); *B60B 3/10* (2013.01); *B60B 21/023* (2013.01);
(Continued)

(58) Field of Classification Search
CPC .... B60B 1/06; B60B 1/08; B60B 3/02; B60B 3/06; B60B 3/10; B60B 21/10;
(Continued)

(56) References Cited

U.S. PATENT DOCUMENTS 2,464,348 A * 3/1949 Roux ..................... B60B 19/10
301/37.38
2009/0179480 A1* 7/2009 Modlinger .............. B60B 19/10
301/6.3
(Continued)

FOREIGN PATENT DOCUMENTS

DE  102011104253 A1 * 3/2012 ............... B60B 1/08
EP  2208621 A1 * 7/2010 ............... B60B 7/01
JP  2020-179746 A  11/2020

OTHER PUBLICATIONS

Machine Translation of DE 102011104253 A1, 5 pages (Year: 2012).*
Machine Translation of EP 2208621 A1, 13 pages (Year: 2010).*

*Primary Examiner* — S. Joseph Morano
*Assistant Examiner* — Emily G. Castonguay
(74) *Attorney, Agent, or Firm* — XSENSUS LLP

(57) ABSTRACT

A rim portion of a vehicle wheel has an outer flange portion. In a region of the outer flange portion, a space portion between spoke portions is disposed on a radial-direction inner side, a first inclined surface and a second inclined surface are provided. The first inclined surface is provided on an axial-direction outer side of an outer flange outer circumferential portion. The second inclined surface is on an axial-direction outer side of an outer flange inner circumferential portion. The first inclined surface is formed to incline from the axial-direction outer side toward an axial-direction inner side as the first inclined surface extends from a radial-direction outer side end toward the radial-direction inner side. The second inclined surface is a surface formed to incline from the axial-direction inner side toward the axial-direction outer side as the second inclined surface extends from the radial-direction outer side toward the radial-direction inner side.

4 Claims, 8 Drawing Sheets

(51) Int. Cl.
  *B60B 3/10* (2006.01)
  *B60B 21/02* (2006.01)
(52) U.S. Cl.
  CPC ........ *B60B 21/026* (2013.01); *B60B 2360/10* (2013.01); *B60B 2900/111* (2013.01); *B60B 2900/112* (2013.01); *B60B 2900/1216* (2013.01); *B60B 2900/513* (2013.01)
(58) Field of Classification Search
  CPC ... B60B 21/102; B60B 21/104; B60B 21/106; B60B 2360/10; B60B 2900/111; B60B 2900/1216; B60B 2900/513
  See application file for complete search history.

(56) References Cited

U.S. PATENT DOCUMENTS

2018/0065407 A1\* 3/2018 Heck ..................... B60B 7/0086
2020/0147997 A1\* 5/2020 Biancalana ............ B62D 35/02

\* cited by examiner

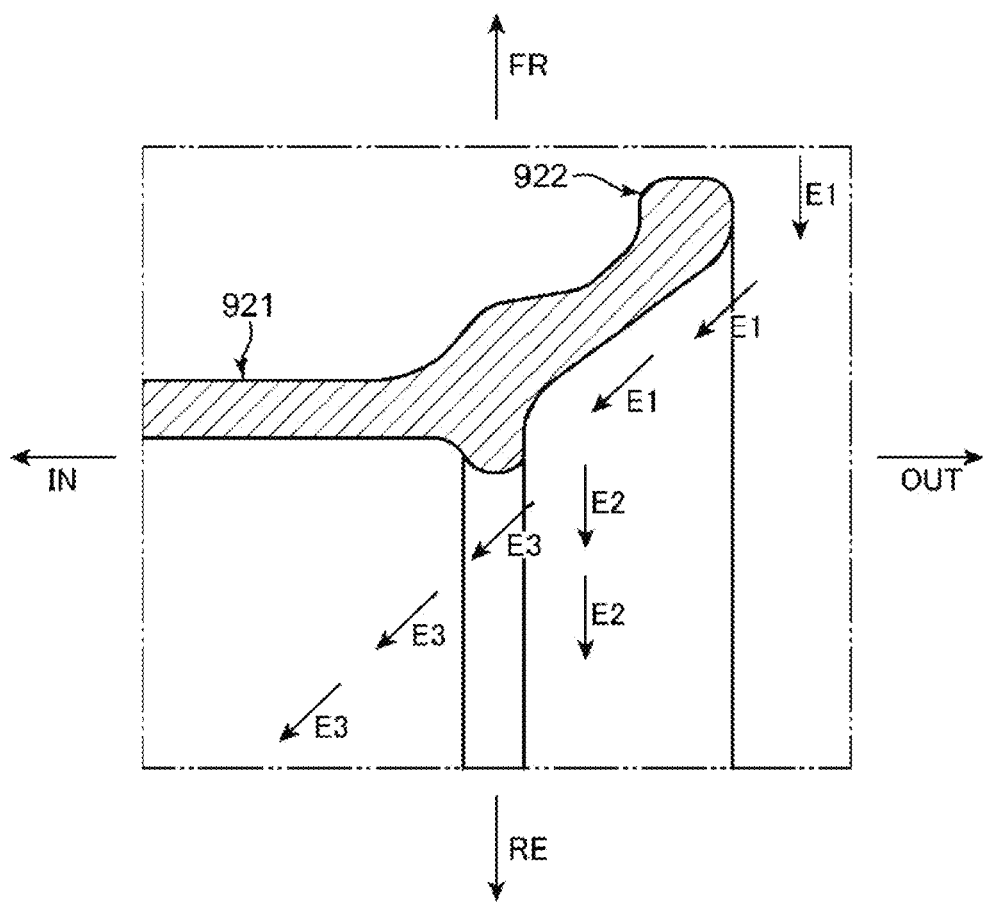
Background Art  FIG. 8

VEHICLE WHEEL

CROSS-REFERENCE TO RELATED APPLICATION

The present application claims priority to Japanese Patent Application 2021-038226, filed Mar. 10, 2021, the entire contents of which are incorporated herein by reference.

BACKGROUND

Field

The present disclosure relates to a vehicle wheel.

Description of the Related Art

In order to improve fuel economy or electric mileage, vehicles such as automobiles are required to further reduce a Cd value (air resistance coefficient).

Conventionally, studies on various devices such as spoilers, deflectors and under covers have been conducted to reduce the Cd value. Moreover, when a vehicle is traveling, a flow of air is disturbed by wheels, and it is important to reduce air resistance of the wheels in order to further reduce the Cd value.

A wheel of a wheel assembly includes: a center disk portion to be mounted on a hub of a vehicle body; a cylindrical rim portion formed coaxially with the center disk; and a spoke portion connecting the center disk portion and the rim portion. A plurality of spoke portions are provided in a circumferential direction, and a space portion is formed between the spoke portions adjacent to each other in the circumferential direction in order to cool a brake disposed on a vehicle-width-direction inner side relative to the center disk portion of the wheel and to cool a tire mounted on the wheel. It is known that, when the vehicle is traveling, a flow of air is disturbed by the air entering into or exiting from a wheel well through the space portion between the spokes of the wheel, which causes resistance.

Specifically, as shown in FIG. 8, the rim portion of the wheel is composed of an outer flange portion 922 formed in a ring shape on the vehicle-width-direction outer side, an inner flange portion formed in a ring shape on the vehicle-width-direction inner side, and a cylindrical well portion 921 formed between the outer flange portion 922 and the inner flange portion. Regarding a wheel according to a prior art, when the vehicle is traveling, air E1 which flows outside the outer flange portion 922 flows along an outer surface of an inner circumferential portion of the outer flange portion 922, and some of the air flows toward the rear side (arrows E2), but some of the air enters into the wheel well from the space portion (arrows E3). The air E3 thus entered into the inside through the space portion collides with the hub and the wheel inner side, and causes resistance.

A technique for rectifying such a flow of air in the wheel when the vehicle is traveling has been studied (Patent Literature 1). In Patent Literature 1, a configuration in which an annular outer member is mounted on the outside of a wheel is disclosed. The outer member disclosed in Patent Literature 1 has a structure that can close a part of the space portion between the spoke portions of the wheel, specifically a region on a radial-direction outer side in the space portion. With the technique disclosed in Patent Literature 1, it is considered that entering and exiting of air through the space portion can be reduced by mounting the outer member on the wheel.

CITATION LIST

Patent Literature

[Patent Literature 1] Japanese Unexamined Patent Publication No. 2020-179746

SUMMARY

However, according to the technique disclosed in Patent Literature 1, it is necessary to provide the outer member separately from the wheel, which causes a rise in cost due to an increase in the number of parts. Moreover, since it is necessary to assemble the outer member with the wheel, a task is increased in the manufacturing process, which also causes a rise in the manufacturing cost.

Here, in order to reduce air resistance in the wheel when the vehicle is traveling, it is considered to reduce the size of the space portion between the spoke portions.

However, since the wheel is made of metal material, if the size of the space portion is reduced, the amount of metal material to be used is increased by the corresponding amount, resulting in an increase in the weight of the wheel. Therefore, this does not lead to an improvement of fuel economy or electric mileage.

The present disclosure has been made to solve the above-mentioned problems, and an object of the present disclosure, among other objects, is to provide a vehicle wheel capable of improving aerodynamic performance when a vehicle is traveling, while preventing a rise in the manufacturing cost and an increase in the weight.

Means for Solving the Problems

A vehicle wheel according to one aspect of the present disclosure includes: a center disk portion; a rim portion; and a plurality of spoke portions. The center disk portion is a section to be mounted on a hub of a vehicle. The rim portion is a cylindrical section which is disposed on a radial-direction outer side so as to be spaced apart from the center disk portion. A plurality of spoke portions are sections which connect the center disk portion and the rim portion, and are disposed with a space portion between those (spoke portions) adjacent to each other in a circumferential direction.

In the vehicle wheel according to the present aspect, the rim portion includes an inner flange portion, an outer flange portion, and a well portion. In an extending direction of a rotation central axis of the vehicle wheel, a side on which the hub is mounted to the center disk portion is an axial-direction inner side, and an opposite side to the axial-direction inner side with the center disk portion therebetween is an axial-direction outer side. In this case, the inner flange portion is a ring-shaped section disposed on the axial-direction inner side. In addition, the outer flange portion is a ring-shaped section disposed on the axial-direction outer side. Further, the well portion is a cylindrical section formed integrally with the inner flange portion and the outer flange portion to connect the inner flange portion and the outer flange portion.

In a region of the outer flange portion, in which the space portion is disposed on the radial-direction inner side, a first inclined surface and a second inclined surface are provided. The first inclined surface is a surface on the axial-direction outer side and formed to incline from the axial-direction outer side toward the axial-direction inner side as the first inclined surface extends from an end of the outer flange portion on the radial-direction outer side toward the radial-direction inner side. The second inclined surface is a surface on the axial-direction outer side and formed to be connected to an end of the first inclined surface on the radial-direction inner side such that the second inclined surface inclines from the axial-direction inner side toward the axial-direction outer side as the second inclined surface extends from the connection point toward the radial-direction inner side, and extends further toward the radial-direction inner side relative to the well portion.

In a vehicle wheel according to the present aspect, in the region in which the space portion is disposed on the radial-direction inner side, the first inclined surface and the second inclined surface are provided on the axial-direction outer side of the outer flange portion of the rim portion. The first inclined surface is a surface which is inclined from the axial-direction outer side toward the axial-direction inner side as the first inclined surface extends from the radial-direction outer side toward the radial-direction inner side. The second inclined surface is a surface which is connected to the first inclined surface, and inclined from the axial-direction inner side toward the axial-direction outer side as the second inclined surface extends from the radial-direction outer side toward the radial-direction inner side. When a vehicle on which the vehicle wheel according to the present aspect has been mounted is traveling, air flowing from the vehicle front side tries to enter into the axial-direction inner side of the vehicle wheel through the space portion between the spoke portions, but, since the outer flange portion has the second inclined surface, the air is guided by the second inclined surface and discharged to the axial-direction outer side (vehicle-width-direction outer side).

Moreover, on the vehicle rear side relative to the rotation central axis of the vehicle wheel, the air flowing from the vehicle front side tries to enter into a wheel well through a gap between a rear end portion of the wheel and a wheel arch, but, since the outer flange portion has the first inclined surface, the air is guided by the first inclined surface and discharged to the axial-direction outer side (vehicle-width-direction outer side). Therefore, if the vehicle wheel according to the present aspect is employed, it is possible to improve aerodynamic performance when the vehicle is traveling.

Further, in the vehicle wheel according to the above aspect, the improvement of aerodynamic performance is achieved by providing the first inclined surface and the second inclined surface at the outer flange portion of the rim portion, and an outer member that is a separate member from the wheel is not mounted on the wheel as in the technique disclosed in Patent Literature 1.

Furthermore, in the vehicle wheel according to the above aspect, the space portion between the spoke portions in the circumferential direction is not integrally closed with a metal material constituting the wheel. Hence, in the vehicle wheel according to the above aspect, it is possible to prevent a rise in the manufacturing cost and an increase in the weight of the wheel.

In the vehicle wheel according to the above aspect, when assuming that there is a first virtual surface orthogonal to the rotation central axis, the first inclined surface and the second inclined surface may be formed such that an angle formed by the first inclined surface with respect to the first virtual surface is greater than an angle formed by the second inclined surface with respect to the first virtual surface.

In the vehicle wheel according to the above aspect, the angle formed by the first inclined surface with respect to the first virtual surface is set greater than the angle formed by the second inclined surface with respect to the first virtual surface. Therefore, the vehicle wheel according to the above aspect is more advantageous for the air flowing from the vehicle front side to guide, along the first inclined surface on the vehicle rear side relative to the rotation central axis of the vehicle wheel, the air which tries to enter into the wheel well through the gap between the rear end portion of the wheel and the wheel arch, so that the air is discharged toward the axial-direction outer side (vehicle-width-direction outer side).

In the vehicle wheel according to the above aspect, the outer flange portion may have an outer flange outer circumferential portion, and an outer flange inner circumferential portion. The outer flange outer circumferential portion includes the first inclined surface as a surface on the axial-direction outer side, and constitutes an outer circumferential portion of the outer flange portion. The outer flange inner circumferential portion includes the second inclined surface as a surface on the axial-direction outer side, and constitutes an inner circumferential portion of the outer flange portion. Further, in the vehicle wheel according to the above aspect, when assuming that there is a second virtual surface as a contact surface contacting the outer flange outer circumferential portion and the outer flange inner circumferential portion from the axial-direction outer side, the outer flange outer circumferential portion and the outer flange inner circumferential portion may be formed such that the second virtual surface forms an angle of 15° or smaller with respect to the first virtual surface.

In the vehicle wheel according to the above aspect, the angle formed by the second virtual surface with respect to the first virtual surface is set 15° or smaller. Therefore, the vehicle wheel according to the above aspect is more advantageous in guiding the air from the vehicle front side, which tries to enter into the axial-direction inner side of the vehicle wheel through the space portion between the spoke portions, along the second inclined surface, and discharging the air toward the axial-direction outer side (vehicle-width-direction outer side).

In the vehicle wheel according to the above aspect, when the connection portion between the outer flange outer circumferential portion and the outer flange inner circumferential portion is made a dent portion, the outer flange outer circumferential portion and the outer flange inner circumferential portion may be formed such that the depth of the dent portion with respect to the second virtual surface is 15 mm or less.

In the vehicle wheel according to the above aspect, the depth of the dent portion with respect to the second virtual surface is set 15 mm or less. Therefore, in the vehicle wheel according to the above aspect, when the air flowing along the first inclined surface changes the direction to flow along the second inclined surface, and when the air flowing along the second inclined surface changes the direction to flow along the first inclined surface, it is possible to make it difficult for the air to stagnate in the dent portion. Hence, the vehicle wheel according to the above aspect can prevent occurrence of an air vortex at and near the dent portion, and is more advantageous in improving the aerodynamic performance of the vehicle.

In the vehicle wheel according to the above aspect, a surface of the dent portion on the axial-direction outer side is formed with a curved surface, and the first inclined surface and the second inclined surface may be connected through the curved surface of the dent portion.

In the vehicle wheel according to the above aspect, the surface of the dent portion on the axial-direction outer side is formed with the curved surface. Further, the first inclined surface and the second inclined surface are connected through the curved surface of the dent portion. Therefore, in the vehicle wheel according to the above aspect, the air flowing along the first inclined surface can smoothly change the direction to flow along the second inclined surface and the air flowing along the second inclined surface can smoothly change the direction to flow along the first inclined surface, which is more advantageous in improving the aerodynamic performance of the vehicle.

In the vehicle wheel according to the above aspect, the outer flange outer circumferential portion may be formed to extend further to the axial-direction outer side relative to the outer flange inner circumferential portion.

In the vehicle wheel according to the above aspect, the outer flange outer circumferential portion is formed to extend further to the axial-direction outer side relative to the outer flange inner circumferential portion. Therefore, the air flowing from the vehicle front side can be discharged to the axial-direction outer side (vehicle-width-direction outer side) by the outer flange outer circumferential portion that is the radial-direction outer side of the vehicle wheel. Hence, the vehicle wheel according to the above aspect is more advantageous in preventing the air flowing from the vehicle front side from entering into the wheel well through the space portion between the spoke portions.

In the vehicle wheel according to the above aspect, the center disk portion, the rim portion, and the plurality of spoke portions may be integrally formed using a metal material.

In the vehicle wheel according to the above aspect, the center disk portion, the rim portion, and the plurality of spoke portions are integrally formed using a metal material. Hence, it is possible to realize a high dimensional accuracy without causing misalignments between the center disk portion, the rim portion, and the plurality of spoke portions. Additionally, in the vehicle wheel according to the above aspect, by integrally forming the center disk portion, the rim portion, and the plurality of spoke portions, it is possible to secure higher rigidity compared to two-piece or three-piece vehicle wheels.

Advantages

With the vehicle wheel according to each aspect, it is possible to improve the aerodynamic performance when the vehicle is traveling while preventing a rise in the manufacturing cost and an increase in the weight.

BRIEF DESCRIPTION OF THE DRAWINGS

FIG. 8 is a cross-sectional view showing a flow of air at a vehicle wheel of a prior art.

DESCRIPTION OF EMBODIMENTS

Hereinafter, an embodiment of the present disclosure is described with reference to the drawings. Note that the embodiment described hereinafter is merely one example of the present disclosure, and the present disclosure is not limited to the following embodiment except for the inherent configuration thereof.

1. External Appearance Configuration of Vehicle Wheel 1

Figure 1:
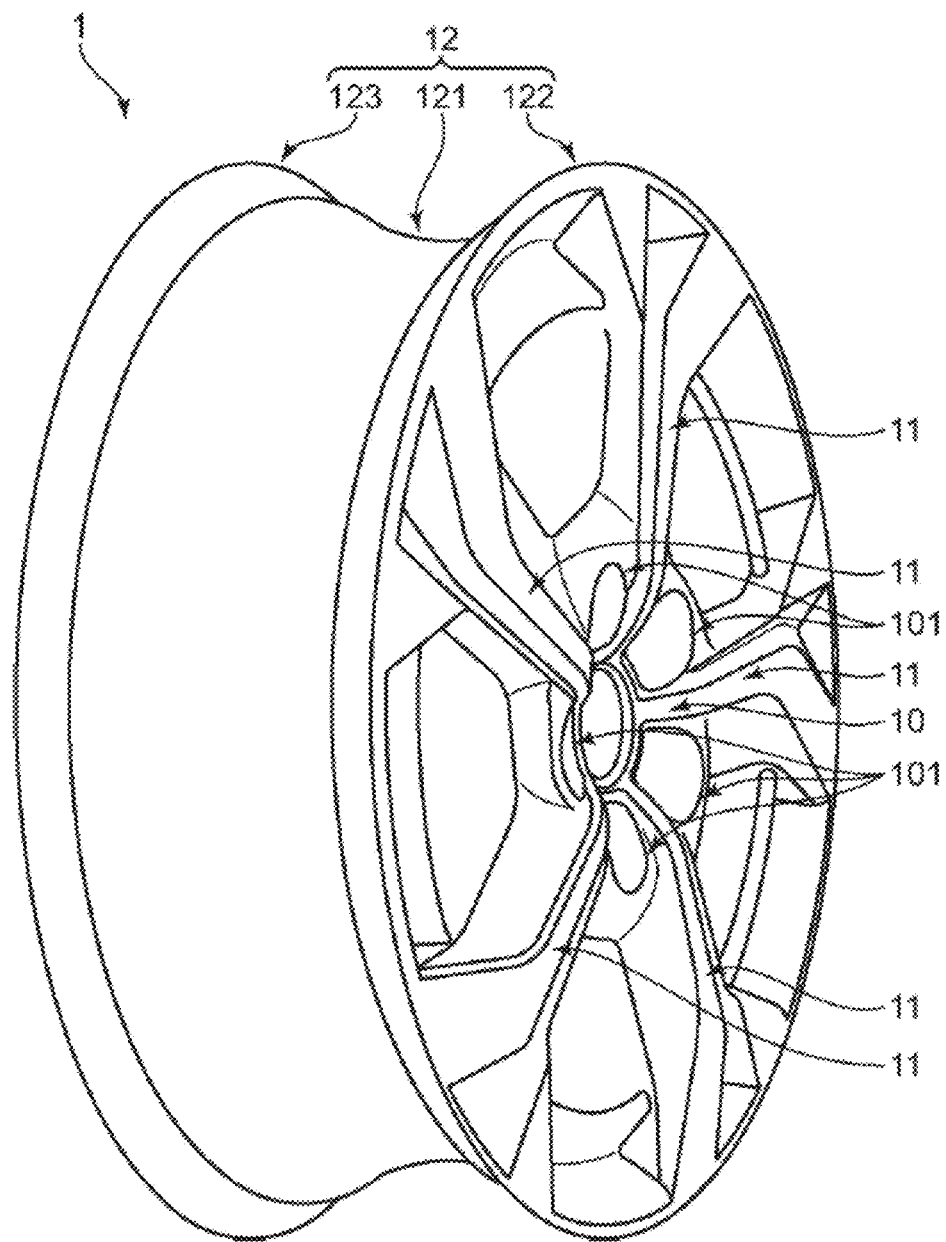
FIG. 1 is a perspective view showing an external appearance configuration of a vehicle wheel according to an exemplary embodiment of the present disclosure.
Figure 2:
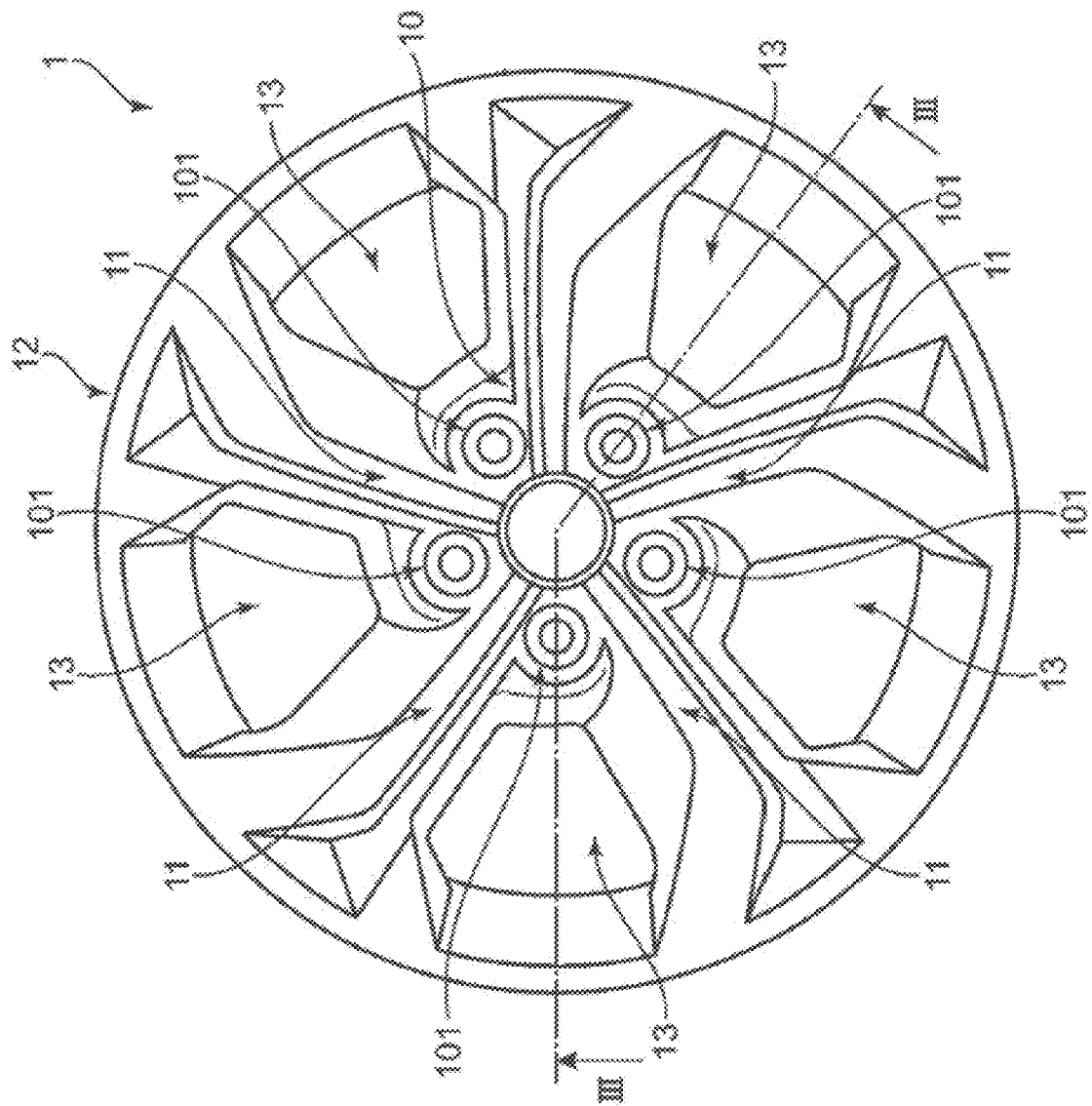
FIG. 2 is a plan view showing the external appearance configuration of the vehicle wheel.
Figure 3:
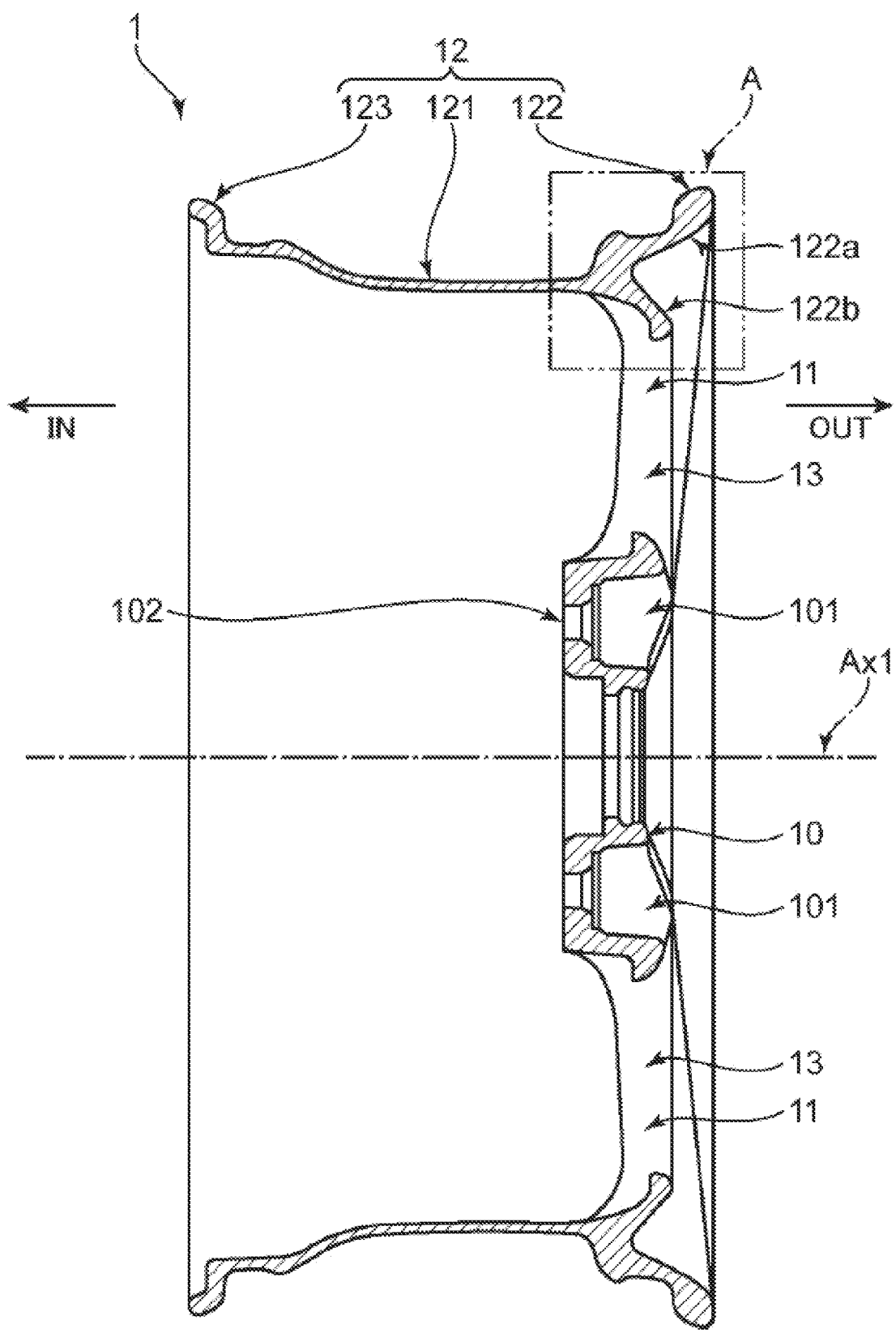
FIG. 3 is a cross-sectional view taken along the III-III line of FIG. 2.

An external appearance configuration of a vehicle wheel 1 according to the embodiment of the present disclosure is described using FIG. 1 to FIG. 3.

As shown in FIG. 1 and FIG. 2, the vehicle wheel 1 includes a center disk portion 10, a plurality of spoke portions 11, and a rim portion 12 which are integrally formed using a metal material (for example, aluminum alloys (including extra super duralumin) and magnesium alloys). The center disk portion 10 is a portion which is mounted on a hub of a vehicle, and has a plurality of bolt holes 101.

Each of the plurality of spoke portions 11 is provided so as to extend in a radial direction as a section which connects the center disk portion 10 and the rim portion 12. As shown in FIG. 2, a space portion 13 is provided between the spoke portions 11 adjacent to each other in a circumferential direction.

The rim portion 12 has a well portion 121, an outer flange portion 122, and an inner flange portion 123. Each of the outer flange portion 122 and the inner flange portion 123 has a ring shape. The well portion 121 is a cylindrical section formed integrally with the inner flange portion 123 and the outer flange portion 122 to connect the inner flange portion 123 and the outer flange portion 122.

Furthermore, in the present description, as shown in FIG. 3, in an extending direction of a rotation central axis Ax1 of the vehicle wheel 1, a side of a mount surface 102 on which the hub of the vehicle is mounted with respect to the center disk portion 10 is defined as the axial-direction inner side, and the opposite side to the axial-direction inner side with the center disk portion 10 therebetween is defined as the axial-direction outer side.

2. Shape of Outer Flange Portion 122

Figure 4:
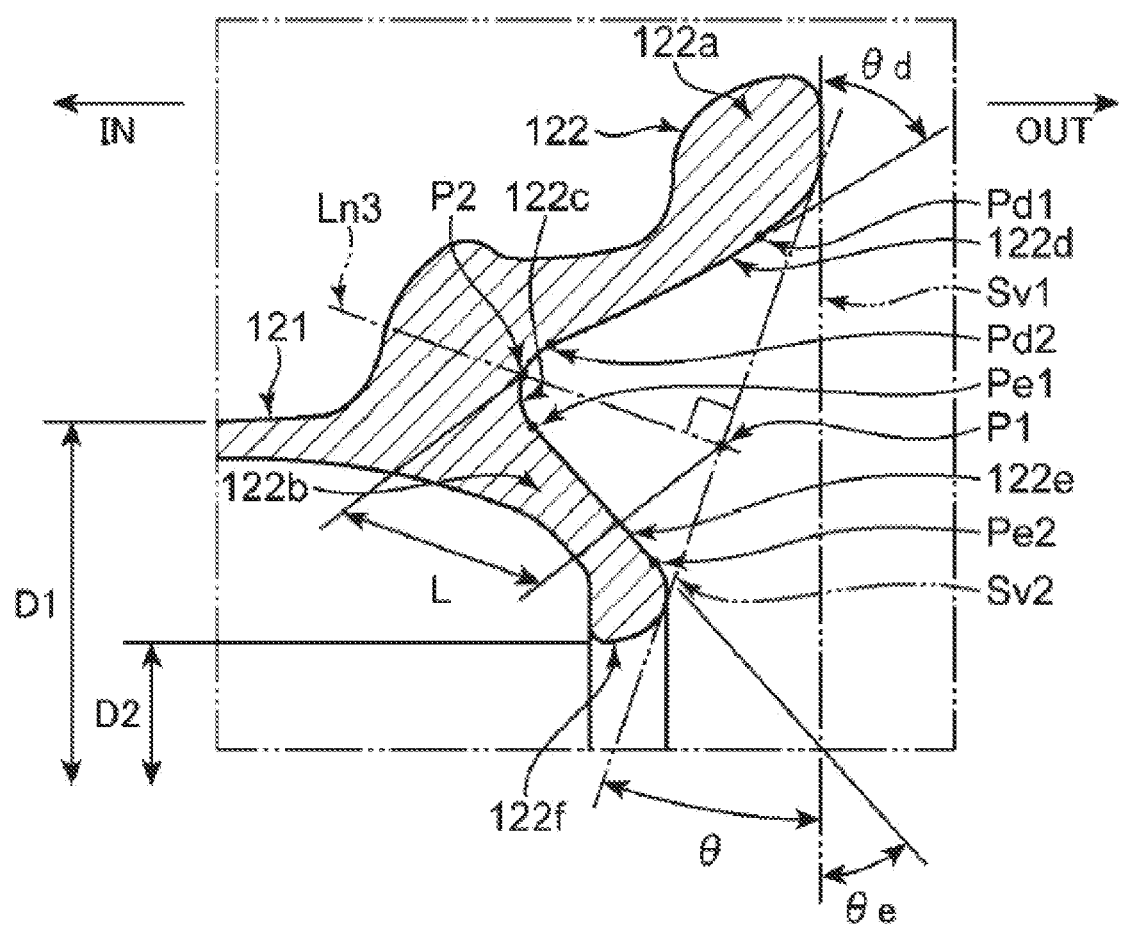
FIG. 4 is an enlarged view showing the A portion of FIG. 3 in an enlarged manner.

The shape of a region of the outer flange portion 122, in which the space portion 13 is disposed on the radial-direction inner side, is described using FIG. 3 and FIG. 4. FIG. 4 is an enlarged cross sectional view of the A portion in FIG. 3.

As shown in FIG. 3, the outer flange portion 122 has an outer flange outer circumferential portion 122a and an outer flange inner circumferential portion 122b formed integrally with each other. As shown in the cross section of FIG. 4, the outer flange outer circumferential portion 122a is a section which extends from an axial-direction outer side end of the well portion 121 toward the radial-direction outer side and the axial-direction outer side. The outer flange inner circumferential portion 122b is a section which is branched from the outer flange outer circumferential portion 122a, and extends from the axial-direction outer side end of the well portion 121 toward the radial-direction inner side and the axial-direction inner side.

As shown in FIG. 4, assume that there is a contact surface (first virtual surface Sv1) that contacts the radial-direction outer side end of the outer flange outer circumferential portion 122a, and is orthogonal to the rotation central axis Ax1 (see FIG. 3). In this case, a surface (first inclined surface 122d) located on the radial-direction inner side and the axial-direction outer side in the outer flange outer circumferential portion 122a is inclined to form an angle θd with respect to the first virtual surface Sv1. More specifically, the first inclined surface 122d is a surface formed to incline from the axial-direction outer side toward the axial-direction inner side as the first inclined surface 122d extends from a radial-direction outer side end Pd1 toward a radial-direction inner side end Pd2.

Moreover, a surface (second inclined surface 122e) located on the radial-direction outer side and the axial-direction outer side in the outer flange inner circumferential portion 122b is inclined to form an angle θe with respect to the first virtual surface Sv1. More specifically, the second inclined surface 122e is a surface formed to incline from the axial-direction inner side toward the axial-direction outer side as the second inclined surface 122e extends from a radial-direction outer side end Pe1 toward a radial-direction inner side end Pe2.

The angle θd and the angle θe satisfy the following relation.

$$\theta d > \theta e \quad \text{(Expression 1)}$$

A dent portion 122c, which is formed to be a dent toward the axial-direction inner side, is interposed between the outer flange outer circumferential portion 122a and the outer flange inner circumferential portion 122b. An axial-direction outer side surface of the dent portion 122c is formed with a curved surface. The first inclined surface 122d and the second inclined surface 122e are connected through the curved surface of the dent portion 122c. Furthermore, the end Pe1 of the second inclined surface 122e corresponds to a connection point which is connected to the first inclined surface 122d through the curved surface of the dent portion 122c.

Next, assume that there is a contact surface (second virtual surface Sv2) that contacts the radial-direction outer side end of the outer flange outer circumferential portion 122a and the radial-direction inner side end of the outer flange inner circumferential portion 122b from the axial-direction outer side. In this case, the first virtual surface Sv1 and the second virtual surface Sv2 intersect each other to form an angle θ. In the present embodiment, the angle θ satisfies the following relation.

$$\theta \leq 15° \quad \text{(Expression 2)}$$

As shown in FIG. 4, in the vehicle wheel 1 according to the present embodiment, the outer flange outer circumferential portion 122a is formed to extend further to the axial-direction outer side relative to the outer flange inner circumferential portion 122b.

Next, the outer diameter of the well portion 121 is represented by D1, and the inner diameter of an inner edge end 122f on the radial-direction inner side of the outer flange inner circumferential portion 122b is represented by D2. In this case, the outer diameter D1 and the inter diameter D2 satisfy the following relation.

$$D2 < D1 \quad \text{(Expression 3)}$$

By satisfying relational expression 3, the second inclined surface 122e is formed to extend further toward the radial-direction inner side relative to the well portion 121.

A depth L of the dent portion 122c with respect to the second virtual surface Sv2 is set to satisfy the following relation.

$$L \leq 15 \text{ mm} \quad \text{(Expression 4)}$$

Furthermore, the depth L of the dent portion 122c is defined by a straight line distance between an intersection point P1 and a base portion P2 when a perpendicular line Ln3 is drawn from the dent portion 122c to the second virtual surface Sv2.

3. Flow of Air at Outer Flange Portion 122 when Vehicle is Traveling

Figure 5A:
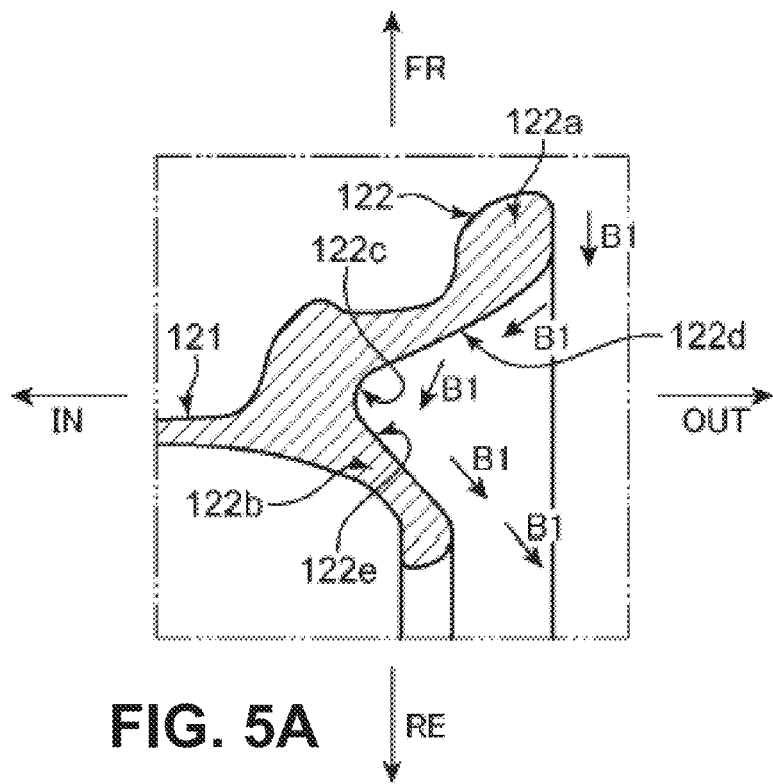
FIG. 5A is a cross-sectional view showing a flow of air in a front portion of the vehicle wheel.
Figure 5B:
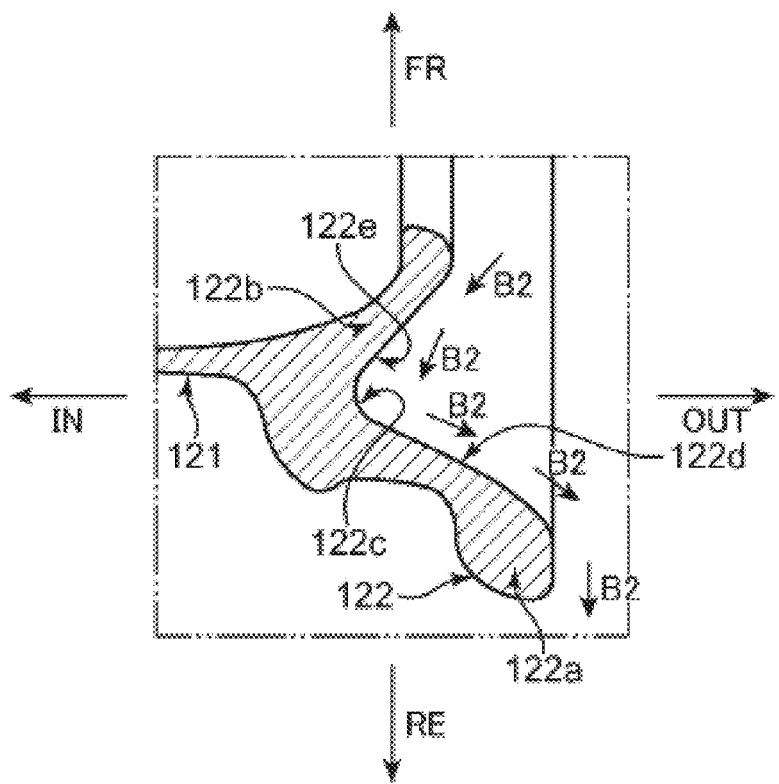
FIG. 5B is a cross-sectional view showing a flow of air in a rear portion of the vehicle wheel.

A flow of air at the outer flange portion 122 when the vehicle is traveling is described using FIGS. 5A and 5B. Note that FIG. 5A is a cross-sectional view showing a flow of air at the outer flange portion 122 in a front portion of the vehicle wheel 1 mounted on the vehicle, and FIG. 5B is a cross-sectional view showing a flow of air at the outer flange portion 122 in a rear portion of the vehicle wheel 1.

As shown in FIG. 5A, when the vehicle is traveling, in the front portion of the vehicle wheel 1, the air is flowing on the axial-direction outer side, from the front side of the vehicle toward the rear side (arrows B1). Then, some of the air flowing from the front side is guided to the axial-direction inner side, along the first inclined surface 122d of the outer flange outer circumferential portion 122a in the front portion of the vehicle wheel 1. The air guided to the axial-direction inner side along the first inclined surface 122d is caused to change the direction toward the axial-direction outer side at the dent portion 122c, and is guided to the axial-direction outer side (vehicle-width-direction outer side) along the second inclined surface 122e. Consequently, in the vehicle wheel 1 according to the present embodiment, in the front portion of the vehicle wheel 1, the air flowing from the front side is prevented from being dragged into the inside of the vehicle wheel 1 and into a wheel well.

Next, when the vehicle is traveling, as shown in FIG. 5B, in the rear portion of the vehicle wheel 1, air is flowing on the axial-direction outer side, from the front side toward the rear side (arrows B2). Then, some of the air flowing from the front side is guided to the axial-direction inner side, along the second inclined surface 122e of the outer flange inner circumferential portion 122b in the rear portion of the vehicle wheel 1. The air guided to the axial-direction inner side along the second inclined surface 122e is caused to change the direction toward the axial-direction outer side at the dent portion 122c, and is guided to the axial-direction outer side (vehicle-width-direction outer side) along the first inclined surface 122d. Consequently, in the vehicle wheel 1 according to the present embodiment, in the rear portion of the vehicle wheel 1, the air flowing from the front side is discharged to the vehicle-width-direction outer side, thereby preventing retention of airflow in the wheel well.

4. Various Values Related to Shape of Outer Flange Portion 122

Figure 6:
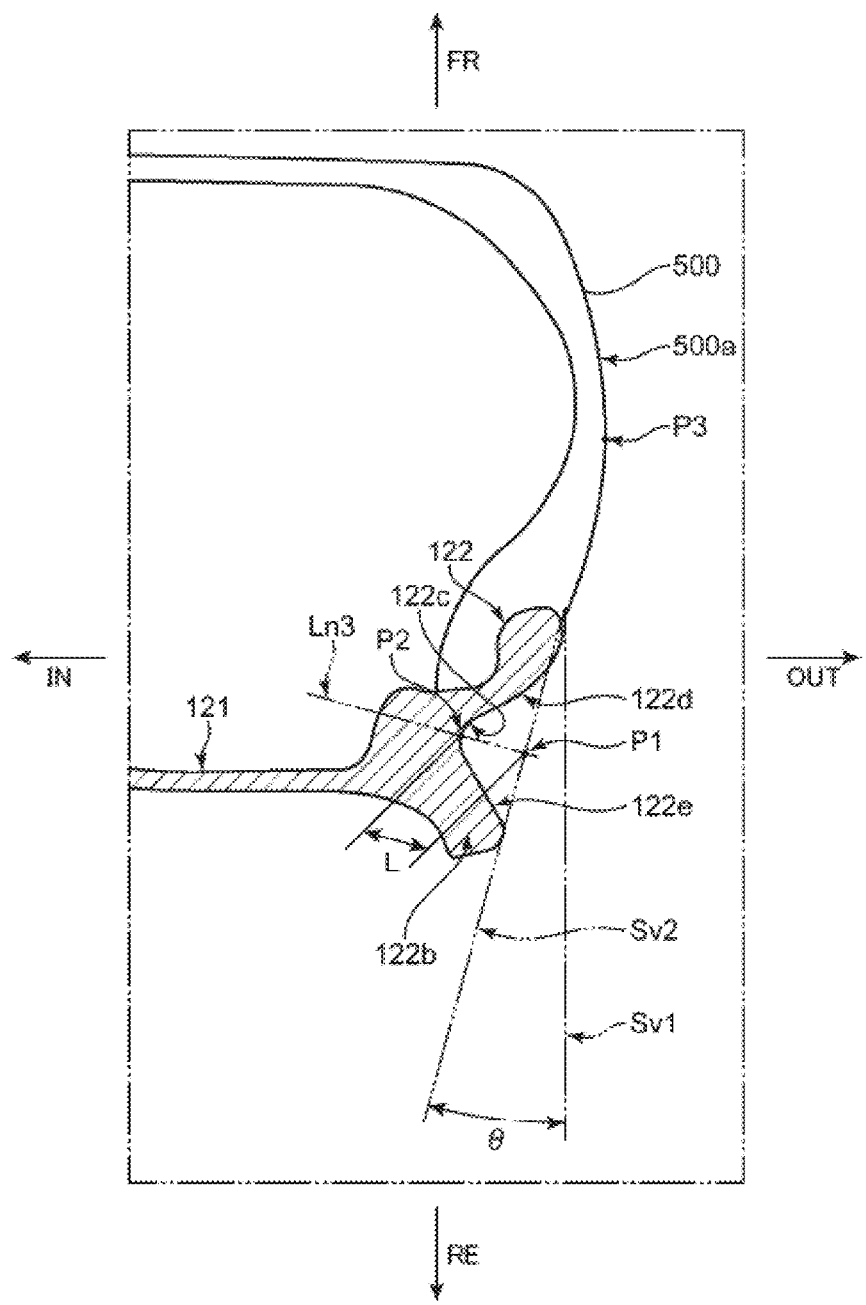
FIG. 6 is a cross-sectional view partially showing the vehicle wheel on which a tire is mounted.

The setting of each value related to the shape of the outer flange portion 122 of the vehicle wheel 1 according to the present embodiment are described using FIG. 6 and FIG. 7.

As shown in FIG. 6, suppose a model in which a tire 500 is mounted on the vehicle wheel 1 according to the present embodiment. In a state in which the tire is mounted on the vehicle wheel 1, a most expanded point of an outside surface 500a of the tire 500 is represented by P3.

Note that the respective portions of the outer flange portion 122 of the vehicle wheel 1 are as described above.

Figure 7A:
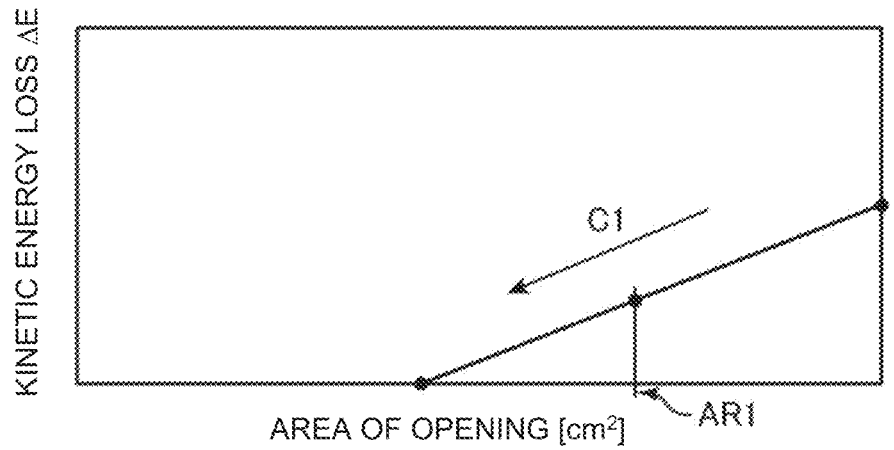
FIG. 7A is a graph showing a relation between the area of an opening and ΔE.

In the graph shown in FIG. 7A, the horizontal axis represents the area AR of an opening of the space portion 13 of the vehicle wheel 1 according to the present embodiment, and the vertical axis represents a kinetic energy loss ΔE of air. As shown in FIG. 7A, the smaller the area AR of the opening, the smaller the kinetic energy loss ΔE (arrow C1).

However, when the area AR of the opening of the vehicle wheel 1 is made smaller, the air that is supplied to a brake is also reduced. Therefore, when the area AR of the opening is made too small, brake performance is lowered. The inventors of the present application have eagerly studied and reached a conclusion that in order to secure the brake performance while making the kinetic energy loss ΔE of air as small as possible, it is preferable to set the area AR1 of the opening within a range of 350 to 400 cm². More preferably, the area AR1 of the opening is set within a range of 380 to 390 cm².

Figure 7B:
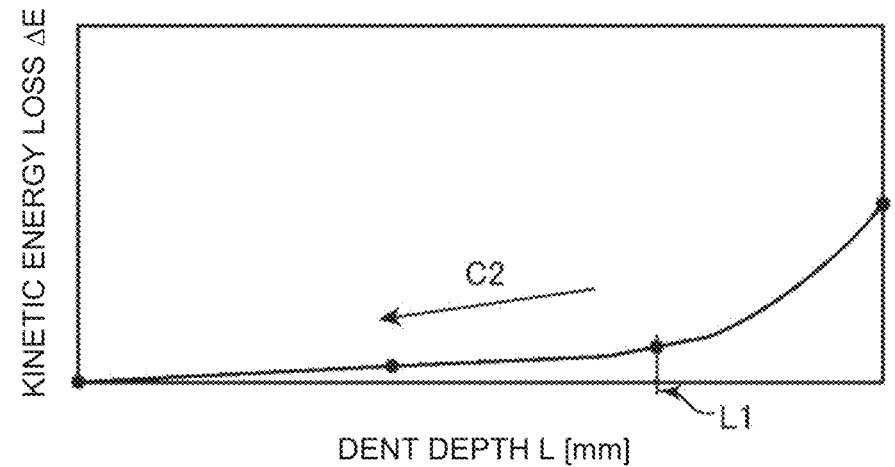
FIG. 7B is a graph showing a relation between the depth of a dent and ΔE.

Next, in the graph shown in FIG. 7B, the horizontal axis represents the depth (dent depth) L of the dent portion 122c of the vehicle wheel 1 according to the present embodiment, and the vertical axis represents the kinetic energy loss ΔE of air. As shown in FIG. 7B, the smaller the dent depth L, the smaller the kinetic energy loss ΔE (arrow C2). As shown in FIG. 7B, in the graph showing the relation between the dent depth L and the kinetic energy loss ΔE, there is a multi-order function or exponential function relation, but not a linear function relation.

The inventors of the present application have eagerly studied by taking the mass and design of the vehicle wheel 1 into consideration in addition to the graph shown in FIG. 7B, and reached a conclusion that in order to make the kinetic energy loss ΔE of air as small as possible, it is preferable to set the dent depth L to L1 (equal to or smaller than 15 mm, more preferably equal to or smaller than 14 mm).

Figure 7C:
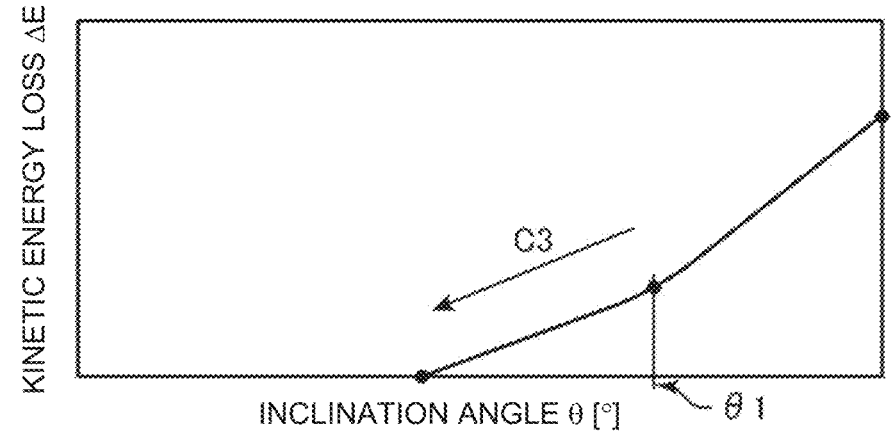
FIG. 7C is a graph showing a relation between an inclination angle and ΔE.

Next, in the graph shown in FIG. 7C, the horizontal axis represents the angle (inclination angle) θ formed by the second virtual surface Sv2 with respect to the first virtual surface Sv1, and the vertical axis represents the kinetic energy loss ΔE of air. As shown in FIG. 7C, the smaller the inclination angle θ, the smaller the kinetic energy loss ΔE (arrow C3). In the graph shown in FIG. 7C, the rate of increase in the kinetic energy loss ΔE is greater when the inclination angle θ exceeds θ1 (15°). Hence, the inventors of the present application have come to a conclusion that in order to make the kinetic energy loss ΔE of air as small as possible, it is preferable to set the inclination angle θ to θ1 (15°) or smaller.

5. Effects

In the vehicle wheel 1 according to the present disclosure, in the region in which the space portion 13 is disposed on the radial-direction inner side, the first inclined surface 122d and the second inclined surface 122e are provided on the axial-direction outer side of the outer flange portion 122 of the rim portion 12. The first inclined surface 122d is a surface which is inclined from the axial-direction outer side toward the axial-direction inner side as the first inclined surface 122d extends from the radial-direction outer side toward the radial-direction inner side. The second inclined surface 122e is a surface which is connected to the first inclined surface 122d with the dent portion 122c therebetween, and is inclined from the axial-direction inner side toward the axial-direction outer side as the second inclined surface 122e extends from the radial-direction outer side toward the radial-direction inner side. When the vehicle having the vehicle wheel 1 mounted thereon is traveling, the air flowing from the vehicle front side tries to enter into the axial-direction inner side of the vehicle wheel 1 through the space portion 13 between the spoke portions 11, but, since the second inclined surface 122e is provided at the outer flange portion 122, the air is guided by the second inclined surface 122e and discharged to the axial-direction outer side (vehicle-width-direction outer side).

Moreover, on the vehicle rear side relative to the rotation central axis Ax1 of the vehicle wheel 1, the air flowing from the vehicle front side tries to enter into the wheel well through a gap between a rear end portion of the wheel and a wheel arch, but, since the first inclined surface 122d is provided at the outer flange portion 122, the air is guided by the first inclined surface 122d and discharged to the axial-direction outer side (vehicle-width-direction outer side). Therefore, if the vehicle wheel 1 according to the present embodiment is employed, it is possible to improve aerodynamic performance when the vehicle is traveling.

Further, in the vehicle wheel 1, the improvement of aerodynamic performance is achieved by providing the first inclined surface 122d and the second inclined surface 122e on the outer flange portion 122 of the rim portion 12, but an outer member which is a separate member from the wheel is not mounted on the wheel as in the technique disclosed in Patent Literature 1. Furthermore, in the vehicle wheel 1, the space portion 13 between the spoke portions 11 in the circumferential direction is not integrally closed with the metal material constituting the wheel 1. Hence, it is possible to prevent a rise in the manufacturing cost and an increase in the weight of the wheel.

Moreover, in the vehicle wheel 1 according to the present embodiment, the angle θd formed by the first inclined surface 122d with respect to the first virtual surface Sv1 is set greater than the angle θe formed by the second inclined surface 122e with respect to the first virtual surface Sv1. Therefore, the vehicle wheel 1 is more advantageous for the air flowing from the vehicle front side to guide, along the first inclined surface 122d on the vehicle rear side relative to the rotation central axis Ax1 of the vehicle wheel 1, the air which tries to enter into the wheel well through the gap between the rear end portion of the wheel and the wheel arch, so that the air is discharged toward the axial-direction outer side (vehicle-width-direction outer side).

Further, in the vehicle wheel 1 according to the present embodiment, the angle formed by the second virtual surface Sv2 with respect to the first virtual surface Sv1 is set 15° or smaller. Therefore, the vehicle wheel 1 is more advantageous in guiding the air from the vehicle front side, which tries to enter into the axial-direction inner side of the vehicle wheel 1 through the space portion 13 between the spoke portions 11, along the second inclined surface 122e, and discharging the air toward the axial-direction outer side (vehicle-width-direction outer side).

Furthermore, in the vehicle wheel 1 according to the present embodiment, the depth L of the dent portion with respect to the second virtual surface Sv2 is set 15 mm or less (more preferably 14 mm or less). Therefore, in the vehicle wheel 1, when the air flowing along the first inclined surface 122d changes the direction to flow along the second inclined surface 122e, and when the air flowing along the second inclined surface 122e changes the direction to flow along the first inclined surface 122d, it is possible to make it difficult for the air to stagnate (it is possible to reduce air retention) in the dent portion 122c. Hence, the vehicle wheel 1 can prevent occurrence of an air vortex (airflow disturbance) at and near the dent portion 122c, and is more advantageous in improving the aerodynamic performance of the vehicle.

Moreover, in the vehicle wheel 1 according to the present disclosure, the axial-direction outer side surface of the dent portion 122c, that is, the surface connecting the first inclined surface 122d and the second inclined surface 122e is formed with a curved surface. Therefore, in the vehicle wheel 1, the air flowing along the first inclined surface 122*d* can smoothly change the direction to flow along the second inclined surface 122*e* and the air flowing along the second inclined surface 122*e* can smoothly change the direction to flow along the first inclined surface 122*d*, which is more advantageous in improving the aerodynamic performance of the vehicle.

Further, in the vehicle wheel according to the present embodiment, the outer flange outer circumferential portion 122*a* is formed to extend further to the axial-direction outer side relative to the outer flange inner circumferential portion 122*b*. Therefore, the air flowing from the vehicle front side can be discharged to the axial-direction outer side (vehicle-width-direction outer side) by the outer flange outer circumferential portion 122*a* that is the radial-direction outer side of the vehicle wheel 1. Hence, the vehicle wheel 1 is more advantageous in reducing the entry of the air flowing from the vehicle front side into the wheel well through the space portion 13 between the spoke portions 11.

Furthermore, in the vehicle wheel 1 according to the present embodiment, the center disk portion 10, the rim portion 12, and the plurality of spoke portions 11 are integrally formed using a metal material. Therefore, it is possible to realize a high dimensional accuracy without causing misalignments between the center disk portion 10, the rim portion 12, and the plurality of spoke portions 11. Additionally, in the vehicle wheel 1, by integrally forming the center disk portion 10, the rim portion 12, and the plurality of spoke portions 11, it is possible to secure higher rigidity compared to two-piece or three-piece vehicle wheels.

As described above, with the vehicle wheel according to the present embodiment, it is possible to prevent a rise in the manufacturing cost, and also improve the aerodynamic performance when the vehicle is traveling, while preventing an increase in the weight.

[Modification]

In the above exemplary embodiment, the outer flange portion 122 is formed in a shape in which the angle θd is greater than the angle θe, but the present disclosure is not limited to this. The vehicle wheel may have an outer flange portion formed in a shape in which the angle θe is greater than the angle θd.

In the above exemplary embodiment, the angle θ formed by the second virtual surface Sv2 with respect to the first virtual surface Sv1 is 15° or smaller, but, in the present disclosure, the angle θ may exceed 15°.

In the above exemplary embodiment, the depth L of the dent portion 122*c* with respect to the second virtual surface Sv2 is 15 mm or less, but, in the present disclosure, the depth L may exceed 15 mm.

In the above exemplary embodiment, the outer flange outer circumferential portion 122*a* is formed to extend further to the axial-direction outer side relative to the outer flange inner circumferential portion 122*b*, but, in the present disclosure, the outer flange outer circumferential portion and the outer flange inner circumferential portion may extend to the same level, or the outer flange inner circumferential portion may extend further to the axial-direction outer side relative to the outer flange outer circumferential portion.

In the above exemplary embodiment, the vehicle wheel 1 in which the center disk portion 10, the rim portion 12, and the plurality of spoke portions 11 are integrally formed using the metal material is presented as one example, but the present disclosure may be applied to two-piece and three-piece vehicle wheels.

REFERENCE SIGNS LIST

1 Vehicle wheel
10 Center disk portion
11 Spoke portion
12 Rim portion
13 Space portion
121 Well portion
122 Outer flange portion
122*a* Outer flange outer circumferential portion
122*b* Outer flange inner circumferential portion
122*c* Dent portion
122*d* First inclined surface
122*e* Second inclined surface
122*f* Inner edge end

The invention claimed is:

1. A vehicle wheel comprising:

a center disk portion to be mounted on a hub of a vehicle;

a cylindrical rim portion disposed on a radial-direction outer side so as to be spaced apart from the center disk portion; and spoke portions connecting the center disk portion and the rim portion, and disposed with a space portion between the spoke portions adjacent to each other in a circumferential direction, wherein in an extending direction of a rotation central axis of the vehicle wheel, when a side on which the hub is mounted to the center disk portion is an axial-direction inner side, and an opposite side to the axial-direction inner side with the center disk portion therebetween is an axial-direction outer side, the rim portion includes:

a ring-shaped inner flange portion disposed on the axial-direction inner side;

a ring-shaped outer flange portion disposed on the axial-direction outer side; and a cylindrical well portion formed integrally with the inner flange portion and the outer flange portion to connect the inner flange portion and the outer flange portion to each other, in a region of the outer flange portion, in which the space portion is disposed on a radial-direction inner side, a first inclined surface and a second inclined surface are provided, the first inclined surface is a surface on the axial-direction outer side and inclines from the axial-direction outer side toward the axial-direction inner side as the first inclined surface extends from an end of the outer flange portion on the radial-direction outer side toward the radial-direction inner side, the second inclined surface is a surface on the axial-direction outer side and connects to an end of the first inclined surface on the radial-direction inner side such that the second inclined surface inclines from the axial-direction inner side toward the axial-direction outer side as the second inclined surface extends from a connection point toward the radial-direction inner side, and extends further toward the radial-direction inner side relative to the cylindrical well portion, wherein when assuming that there is a first virtual surface orthogonal to the rotation central axis, the first inclined surface and the second inclined surface are such that an angle formed by the first inclined surface with respect to the first virtual surface is greater than an angle formed by the second inclined surface with respect to the first virtual surface, the outer flange portion includes:
an outer flange outer circumferential portion which includes the first inclined surface as a surface on the axial-direction outer side, and constitutes an outer circumferential portion of the outer flange portion, and
an outer flange inner circumferential portion which includes the second inclined surface as a surface on the axial-direction outer side, and constitutes an inner circumferential portion of the outer flange portion,
when assuming that there is a second virtual surface as a contact surface contacting the outer flange outer circumferential portion and the outer flange inner circumferential portion from the axial-direction outer side,
the outer flange outer circumferential portion and the outer flange inner circumferential portion are formed such that the second virtual surface forms an angle of 15° or smaller with respect to the first virtual surface,
a connection portion between the outer flange outer circumferential portion and the outer flange inner circumferential portion forms a dent portion,
the outer flange outer circumferential portion and the outer flange inner circumferential portion are located such that a depth of the dent portion with respect to the second virtual surface is 15 mm or less,
a surface of the dent portion on the axial-direction outer side is formed with a curved surface, and
the first inclined surface and the second inclined surface are connected via the curved surface of the dent portion.

2. The vehicle wheel according to claim 1, wherein the outer flange outer circumferential portion extends further to the axial-direction outer side relative to the outer flange inner circumferential portion.

3. The vehicle wheel according to claim 2, wherein the center disk portion, the rim portion, and the spoke portions are integrally formed using a metal material.

4. The vehicle wheel according to claim 1, wherein the center disk portion, the rim portion, and the spoke portions are integrally formed using a metal material.

* * * * *